United States Patent Office 3,579,597
Patented May 18, 1971

3,579,597
PREPARATION OF C₂ SATURATED CHLORINATED COMPOUNDS BY OXYCHLORINATION OF ETHYLENE AND VINYL CHLORIDE WITH A FLUID BED CATALYST
Albert Antonini and Philippe Joffre, Paris, and Claude Vrillon, Montmagny, France, assignors to Produits Chimiques Pechiney-Saint-Gobain, Paris, France
No Drawing. Filed May 20, 1968, Ser. No. 730,611
Claims priority, application France, May 19, 1967, 106,971
Int. Cl. C07c 17/06
U.S. Cl. 260—658R
16 Claims

ABSTRACT OF THE DISCLOSURE

A process for the preparation of 1,2-dichloroethane, 1,1,2-trichloroethane, 1,1,2,2-tetrachloroethane and pentachloroethane simultaneously by oxychlorination of ethylene and vinyl chloride in admixture with a fluidized bed catalyst.

---

This invention relates to a process for the preparation simultaneously of 1,2 - dichloroethane, 1,1,2 - trichloroethane, 1,1,2,2-tetrachloroethane and pentachloroethane by oxychlorination of a mixture of ethylene and vinyl chloride with a fluidized bed catalyst.

It is well known that oxychlorination of ethylene in the presence of an appropriate fluidized bed catalyst yields 1,2-dichloroethane. It is also known that oxychlorination reactions can be used to provide other chlorinated compounds of ethane and of ethylene, such as dichloroethylenes, trichloroethylene, 1,1,2-trichloroethane and 1,1,2,2-tetrachloroethane. However, the prior art processes do not yield large amounts of C₂ saturated compounds more highly chlorinated than 1,2-dichloroethane without side reactions such as combustion, partial ethylene oxidation and/or reactions of dehydrochlorination leading to C₂ unsaturated chlorinated compounds.

Furthermore, catalysts usually used in oxychlorination of ethylene give rise to a reaction resulting essentially in 1,2-dichloroethane.

It is also known that oxychlorination of vinyl chloride alone with a fluidized bed catalyst yields essentially 1,1,2-trichloroethane. This reaction is subject to several difficulties: the total vinyl chloride conversion rate is relatively low, usually below 93%; the amount of chlorinated ethylenic by-products and combustion products (CO+CO₂) is substantial, generally going as high as 10–25%.

Moreover, the amount of 1,1,2-trichloroethane formed increases with increase in residence time of the vinyl chloride in the reactor. As a result, a significant total vinyl chloride conversion rate to 1,1,2-trichloroethane can be obtained only at the expense of productivity of the process.

The leading difficulty is to be able to limit the formation of ethylenic chlorinated derivatives, essentially dichloroethylenes. In fact, it is known that 1,1,2-trichloroethane transforms into dichloroethylenes by dehydrochlorination when in the presence of a metal chloride and/or oxychloride based catalyst, such as copper chloride and/or oxychlorides, at a temperature of from 300°–400° C.

Furthermore, the processes of the prior art do not provide significant proportions of 1,1,2,2-tetrachloroethane and pentachloroethane. These compounds are of interest either alone or as raw materials for the preparation of other chlorinated compounds.

Unexpectedly it has been found that when a mixture of ethylene and vinyl chloride is subjected to oxychlorination with a fluid bed catalyst, besides 1,2-dichloroethane, there is formed a high proportion of 1,1,2-trichloroethane and 1,1,2,2-tetrachloroethane along with pentachloroethane, in which the proportion corresponds to at least 15 molar percent and more often 20–50 molar percent, and in some instances over 80 molar percent based upon the ethylene and vinyl chloride transformed, without noticeable reactions of dehydrochlorination to form ethylenic chlorinated derivatives, such as dichloroethylenes, or of combustion reactions.

In effect, the main object of this invention is to produce essentially C₂ saturated chlorinated derivatives, particularly 1,1,2,2-tetrachloroethane, in substantial proportions, while limiting the proportion of C₂ ethylenic chlorinated derivatives to less than 4 molar percent and the proportion of combustion products to less than 3.5 molar percent, when calculated on the mixture of ethylene and vinyl chloride involved in the reaction.

It has been established by applicants that ethylene and/or its transformation products compete in the reaction mixture with vinyl chloride in the reaction which takes place at the level of the catalyst, unexpectedly to diminish the formation of undesirable ethylenic chlorinated derivatives. Furthermore, this invention relates to a new combination of means which consists in the combination of using a catalyst fluidized bed, defined reaction temperatures and predetermined molar feed ratios of reagents, particularly that of $O_2/(C_2H_4+C_2H_3Cl)$.

A still further object of this invention resides in a new and improved catalytic system for use in the oxychlorination of ethylene and vinyl chloride mixtures.

In accordance with the oxychlorination process of this invention, a gas comprising molecular oxygen or a gas containing same, hydrochloric acid, and an ethylene and vinyl chloride mixture, in which the materials are present in the mixture in the amount of 15 molar percent but not more than 93 molar percent ethylene and more than 7 molar percent but not more than 85 molar percent vinyl chloride, at a temperature within the range of 300°–370° C. and preferably within the range of 310°–350° C., is passed through a reaction zone containing a catalyst in a fluidized state. The ethylene and vinyl chloride mixture is transformed to a mixture of chlorinated derivatives of ethane, containing essentially 1,2-dichloroethane, 1,1,2-trichloroethane, 1,1,2,2-tetrachloroethane and pentachloroethane in variable proportions.

The feed flow rate of ethylene and vinyl chloride mixture to the reaction zone is within the range of 0.5 to 20 moles per hour per liter of catalyst and preferably 1–8 moles per hour per liter of catalyst. The molar feed ratios of the reagents are as follows: $HCl/(C_2H_4+C_2H_3Cl)$ within the range of 2.0 to 3.0 and preferably above 2.2; $O_2/(C_2H_4+C_2H_3Cl)$ within the range of 0.6 to 1.5 and preferably within the range of 0.65 to 1.0;

$$C_2H_3Cl/(C_2H_4+C_2H_3Cl)$$

within the range of 0.07 to 0.85, and $HCl/O_2$ within the range of 2 to 4 and preferably less than 3.3.

The catalyst used for carrying out the process of this invention is in the form of a catalytic agent deposited on a carrier having an average specific surface of at least 1 m.²/g. and preferably above 10 m.²/g. The term "average specific surface" is used by reason of the fact that if a series of control samples are taken from different points of the catalytic bed in order to determine the carrier specific surface by the B.E.T. method, the determinations will show a dispersion; however, the extreme values of the determination will not deviate by more than 25% from the average value.

As the carrier for the catalytic agent, use can be made of one or several substances such as alumina, magnesia, graphite, activated carbon, alumino-silicates, and preferably clays, in which the carrier has the aforementioned characteristics. The average particle size of the carrier should be within the range of 20 to 400 microns and preferably 40 to 120 microns. Good results are obtained with the use of an attapulgite type clay which, when used in the oxychlorination reaction of this invention, has an average specific surface of 10 to 160 m.$^2$/g. Very good results are obtained with a carrier consisting essentially of silica and magnesia having an average specific surface area in the range of 40 to 200 m.$^2$/g. and which exhibits excellent characteristics for purposes of fluidization.

Catalytic agents used in the process are made up essentially of at least one compound of the following elements: bismuth, cadmium, chromium, cobalt, copper, tin, iron, magnesium, manganese, alkali metals, alkaline earth metals, nickel, platinium, rare earths, thorium, vanadium, zinc and zirconium.

Pressure is not a controlling factor in the reaction but it is preferred to carry out the oxychlorination of this invention at a pressure within the range of 1 to 10 absolute bars and preferably within the range of 4 to 9 absolute bars.

In accordance with a modification of this invention, 1,2-dichloroethane can be introduced as a component with the described reagents into the catalytic reaction zone. When employed, said 1,2-dichloroethane is added in a molecular ratio below 2, based on the ethylene and vinyl chloride mixture.

The following examples are given by way of illustration, but not by way of limitation of the practice of this invention:

EXAMPLES 1 to 6

The oxychlorination reaction of ethylene and vinyl chloride mixtures is carried out in the proportions defined in the following Table I. The reaction is carried out in a glass reactor having an internal diameter of 65 mm. and a height of 1000 mm. and having an external electric resistance heater. The lower portion of the tube is formed with a reversed cone filled with glass beads of 2 mm. in diameter for mixing the gaseous reactants and to diffuse the gases through the catalytic bed. The height of the catalytic bed, at rest after fluidization, is 450 mm. The catalyst is prepared by impregnating an attapulgite type clay with an aqueous solution of $Cl_2Cu \cdot 2H_2O$ and KCl in amounts to provide a final content of dry catalyst in which copper cations and potassium cations are respectively 8.7% by weight and 4.8% by weight. The average specific surface area of the carrier, after the catalyst has been operated under normal conditions for about 100 hours, is about 80 m.$^2$/g. The catalytic mass has a granular distribution ranging from 100 to 315 microns with 50% being less than 210 microns.

During the operation, the reactants ethylene, air and gaseous hydrochloric acid are introduced under absolute pressure of 1.05 bar into the lower portion of the reversed cone and the reactor is heated by regulating the temperature of the external wall of the tube as controlled by thermocouples placed between the external wall of the tube and the electrical resistance heaters. The temperature of the catalytic bed remains constant and homogeneous at 325° C.±2° C. for Examples 1 to 4 and 6 and 340° C.±2° C. for Example 5.

The composition of the reaction product varies as a function of the temperature of the catalytic bed and the feed ratio of the reactants.

The results which are presented hereinafter in Table I can be maintained constant over several thousand hours of operation. The activity of the catalyst does not vary substantially after 2500 hours of operation. The table gives a characteristic ratio of the results obtained defined as follows:

$$K = \frac{x + Y + Z}{W}$$

wherein:

$x$ represents the conversion rate of ethylene and vinyl chloride mixture into 1,1,2-trichloroethane $Y$ represents the conversion rate of ethylene and vinyl chloride mixture into 1,1,2,2-tetrachloroethane $Z$ represents the conversion rate of ethylene and vinyl chloride mixture into pentachloroethane $W$ represents the conversion rate of ethylene and vinyl chloride mixture into 1,2-dichloroethane This ratio can be compared advantageously with the feed ratio:

$$K_0 = \frac{\text{moles of } C_2H_3Cl}{\text{moles of } C_2H_4}$$

which is also given in the Table I.

TABLE I

| Example Number | 1 | 2 | 3 | 4 | 5 | 6 |
|---|---|---|---|---|---|---|
| Flow rate of mixture ($C_2H_4+C_2H_3Cl$) mole/hr. per liter of catalyst | 1.27 | 1.22 | 1.16 | 1.25 | 1.22 | 2.40 |
| Molar feed ratios: | | | | | | |
| $C_2H_3Cl/(C_2H_4+C_2H_3Cl)$ | 0.14 | 0.31 | 0.41 | 0.81 | 0.48 | 0.20 |
| $HCl/(C_2H_4+C_2H_3Cl)$ | 2.09 | 2.30 | 2.38 | 2.22 | 2.51 | 2.40 |
| $O_2/(C_2H_4+C_2H_3Cl)$ | 0.71 | 0.75 | 0.79 | 0.73 | 0.76 | 0.87 |
| W | 71.8 | 56.2 | 44.7 | 15.6 | 32.0 | 62.6 |
| $x$ | 14.1 | 25.3 | 30.7 | 57.9 | 32.0 | 22.2 |
| Y | 8.2 | 12.2 | 17.1 | 18.9 | 27.2 | 7.8 |
| Z | 0.2 | 0.7 | 1.3 | 1.6 | 1.9 | 0.7 |
| Conversion rate of mixture ($C_2H_4+C_2H_3Cl$) into $CO_2$ | 2.5 | 2.5 | 2.6 | 1.3 | 3.4 | 1.3 |
| Conversion rate of mixture ($C_2H_4+C_2H_3Cl$) into chlorinated ethylenic byproducts | 2.8 | 2.8 | 2.8 | 3.8 | 3.1 | 2.2 |
| Total conversion rate of reactants, molar percent: | | | | | | |
| $C_2H_4$ | 99.8 | 99.8 | 99.7 | 99.9 | 99.9 | 97.1 |
| $C_2H_3Cl$ | 98.5 | 99.4 | 98.4 | 98.9 | 99.2 | 95.6 |
| HCl | 94.6 | 93.5 | 93.0 | 96.8 | 94.1 | 91.4 |
| ($W+x+Y+Z$) | 94.3 | 94.4 | 93.8 | 94.0 | 93.1 | 93.3 |
| $K_0$ | 0.16 | 0.45 | 0.70 | 4.26 | 0.92 | 0.25 |
| K | 0.32 | 0.68 | 1.10 | 5.02 | 1.91 | 0.49 |

By way of comparison, Example 4 was re-run two times, once with a feed mixture of ethylene and vinyl chloride in a molar ratio $C_2H_3Cl/(C_2H_4+C_2H_3Cl)$ of 0.90 (test a) and the other with vinyl chloride alone in the molar ratio $C_2H_3Cl/(C_2H_4+C_2H_3Cl)$ being equal to 1 (test b).

The results are set forth in the following Table II:

TABLE II

| | Test a | Test b |
|---|---|---|
| Conversion rate of ethylene and vinyl chloride mixture, molar percent into: | | |
| 1,2-dichloroethane | 7.2 | 0 |
| 1,1,2-trichloroethane | 63.2 | 59.0 |
| 1,1,2,2-tetrachloroethane | 19.7 | 26.0 |
| Pentachloroethane | 2.1 | 2.2 |
| $CO_2$ | 1.7 | 1.5 |
| Ethylenic byproducts | 5.2 | 9.4 |
| Total conversion rate of reactants: | | |
| Ethylene | 99.5 | |
| Vinyl chloride | 98.9 | 98.1 |
| Hydrochloric acid | 96.0 | 95.9 |
| (1,2-dichloroethane plus 1,1,2-trichloroethane plus 1,1,2,2-tetrachloroethane plus pentachloroethane) | 92.2 | 87.2 |
| $K_0$ | 9.0 | |
| K | 11.8 | |

In the tests (a) and (b), wherein the feed molar ratio $C_2H_3Cl/(C_2H_4+C_2H_3Cl)$ exceeds the upper limit of 0.85, it will be observed that the formation rate of ethylenic by-products becomes relatively significant and rises respectively to 5.2 and 9.4 molar percent whereas in Example 4 it is only 3.8 molar percent.

EXAMPLE 7

The oxychlorination of ethylene and vinyl chloride mixture is carried out in the same device as that used in Examples 1-6 but with the alternate procedure which consists in adding vapors of 1,2-dichloroethane to the feed in the molar ratio: $CH_2Cl-CH_2Cl/(C_2H_4+C_2H_3Cl)=0.40$
The molar feed ratios of the other ingredients are as follows:

$C_2H_3Cl/(C_2H_4+C_2H_3Cl)=0.81$
$HCl/(C_2H_4+C_2H_3Cl)=2.22$
$O_2/(C_2H_4+C_2H_3Cl)=0.73$

The specific flow rate of the ethylene and vinyl chloride mixture is 1.22 moles per hour per liter of catalyst.

The following results have been obtained:
Conversion rate of the ethylene and vinyl chloride mixture into:

| | Molar percent |
|---|---|
| 1,2-dichloroethane | 15.9 |
| 1,1,2-trichoroethane | 58.4 |
| 1,1,2,2-tetrachloroethane | 18.8 |
| Pentachloroethane | 1.2 |
| $CO_2$ | 1.2 |
| Eethylenic by-products | 2.7 |

Total conversion rate of reactants:

| | |
|---|---|
| Ethylene | 99.0 |
| Vinyl chloride | 98.2 |
| Hydrochloric acid | 96.2 |

The sum of the conversion rates into 1,2-dichloroethane, 1,1,2-trichloroethane, 1,1,2,2-tetrachloroethane and pentachloroethane is: 94.3 molar percent. The ratios $K_0$ and K, as defined in Examples 1-6, have the values 4.26 and 4.93 respectively.

EXAMPLE 8

The oxychlorination reaction of an ethylene and vinyl chloride mixture having 10 molar percent vinyl chloride and 90 molar percent ethylene is carried out in a reactor made of ordinary steel having a diameter of 240 mm. and a height of 3500 mm. It is heated externally by electric rings. In the lower portion, a perforated grid is provided having openings 3 mm. in diameter to provide a total open space of 0.4% for distribution and introduction of previously mixed reactants. Within the reactor, and over a height of 600 mm., a set of 9 vertical interconnected tubes is traversed by a thermal fluid. At the upper portion of the reactor, a cyclone separator is provided for removal of particles of catalyst entrained in the gases for return to the reactor. The catalyst is prepared by impregnating an attapulgite clay with a solution of copper and potassium chlorides. The granulometry of the finished catalyst is between 50 and 620 microns with an average of about 350 microns. The copper and potassium cation content is respectively 10% and 6% by weight of the finished catalyst. The average specific surface area is about 20 m.²/g. after the catalyst has been operated for 500 hours of reaction.

A mixture of the reactants ethylene, vinyl chloride, air and hydrochloric acid is introduced under a pressure of 1.3 bars in the molar ratio of $O_2/(C_2H_4+C_2H_3Cl)=0.77$ and $HCl/(C_2H_4+C_2H_3Cl)=2.20$. The flow rate of the ethylene and vinyl chloride mixture is 1.3 moles per hour per liter of catalyst. The height of the catalytic bed, at rest, is 2400 mm. The temperature of the fluidized bed is maintained uniform at 320° C.

Under these conditions, the following results were obtained:

| | Percent |
|---|---|
| Total conversion rate of ethylene | 93.8 |
| Conversion rate of vinyl chloride | 89 |
| Conversion rate of hydrochloric acid | 93.2 |
| Conversion rate of ethylene and vinyl chloride mixture into 1,2-dichloroethane | 67.3 |
| Conversion rate of ethylene and vinyl chloride mixture into 1,1,2-trichloroethane | 17 |
| Conversion rate of ethylene and vinyl chloride mixture into 1,1,2,2-tetrachloroethane | 6.5 |
| Conversion rate of ethylene and vinyl chloride mixture into pentachloroethane | 0.3 |
| Conversion rate of ethylene and vinyl chloride mixture into chlorinated ethylenic products | 1.3 |
| Conversion rate of ethylene and vinyl chloride mixture into combustion products ($CO_2$) | 1.0 |

The ratios K and $K_0$, as defined in Examples 1-6, are 0.35 and 0.11, respectively.

EXAMPLE 9

By means of the reactor of Example 8 and by raising the reaction temperature to 340° C., the other experimental conditions remaining the same as that of Example 8, the following results are obtained:

| | Percent |
|---|---|
| Total conversion rate of ethylene | 95.9 |
| Total conversion rate of hydrochloric acid | 95.6 |
| Total conversion rate of vinyl chloride | 90 |
| Conversion rate of ethylene and vinyl chloride mixture into 1,2-dichloroethane | 66.2 |
| Conversion rate of ethylene and vinyl chloride mixture into 1,1,2-trichloroethane | 16.9 |
| Conversion rate of ethylene and vinyl chloride mixture into 1,1,2,2-tetrachloroethane | 7.6 |
| Conversion rate of ethylene and vinyl chloride mixture into pentachloroethane | 0.4 |
| Conversion rate of ethylene and vinyl chloride mixture into chlorinated ethylenic products | 2.4 |
| Conversion rate of ethylene and vinyl chloride mixture into combustion products ($CO_2$) | 2.0 |

The ratios K and $K_0$, as defined in Examples 1-6, are 0.38 and 0.11 respectively.

EXAMPLE 10

The oxychlorination reaction of ethylene and vinyl chloride mixtures, having 10 molar percent vinyl chloride based on the ethylene, is carried out in a reactor made of nickel having an internal diameter of 162 mm. and a height of 2500 mm. provided with external resistance heaters and with copper coils through which a thermal fluid may be circulated for cooling. At the lower portion, a system of perforated grids are provided having openings 3 mm. in diameter to provide for a total open space of 1.2% for distributing and introducing the previously mixed reactants. At the upper portion, there is provided a filtering device which retains the catalyst particles entrained by the gaseous stream. The catalyst is the same as that of Example 8. The mixture of ethylene and vinyl chloride, previously mixed with air and hydrochloric acid, in the molar ratio $O_2/(C_2H_4+C_2H_3Cl)=0.75$ and $HCl/(C_2H_4+C_2H_3Cl)=2.20$ is introduced into the reactor under a pressure of 2.5 absolute bars. The flow rate of the ethylene and vinyl chloride mixture is 5 moles per hour per liter of catalyst. The height of the catalytic bed, at rest, is 1500 mm. The temperature of the fluidized bed is maintained uniform at about 340° C.

Under these conditions, the following results were obtained:

| | Percent |
|---|---|
| Total conversion rate of ethylene | 94 |
| Total conversion rate of vinyl chloride | 87 |
| Total conversion rate of hydrochloric acid | 94 |
| Conversion rate of ethylene and vinyl chloride mixture into 1,2-dichloroethane | 67 |
| Conversion rate of ethylene and vinyl chloride mixture into 1,1,2-trichloroethane | 16 |
| Conversion rate of ethylene and vinyl chloride mixture into 1,1,2,2-tetrachloroethane | 6 |
| Conversion rate of ethylene and vinyl chloride mixture into pentachloroethane | 0.8 |
| Conversion rate of ethylene and vinyl chloride mixture into chlorinated ethylenic products | 2.7 |
| Conversion rate of ethylene and vinyl chloride mixture into combustion products ($CO_2$) | 2.0 |

The ratios K and $K_0$, as defined in Examples 1-6, are 0.33 and 0.10, respectively.

It will be apparent from the foregoing that there is provided a new and efficient means for conversion of ethylene and vinyl chloride mixtures by oxychlorination to produce $C_2$ saturated chlorinated products containing substantial amounts of 1,1,2-trichloroethane and particularly relatively high yields of 1,1,2,2-tetrachloroethane and pentachloroethane.

It will be understood that changes may be made in the details of formulation and operation without departing from the spirit of the invention, especially as defined in the following claims.

We claim:

1. A process for oxychlorination of a mixture of ethylene and vinyl chloride to produce chlorinated derivatives of ethane in which at least 15 mole percent comprises 1,1,2 - trichloroethane, 1,1,2,2 - tetrachloroethane and pentachloroethane comprising the step of passing a gaseous feed mixture of HCl, an oxygen-containing gas and the mixture of ethylene and vinyl chloride containing 15 to 93 mole percent ethylene and 7 to 85 mole percent vinyl chlorine in which the ratio of oxygen to the ethylene and vinyl chloride is within the range of 0.6 to 1.5 and the ratio of HCl to ethylene and vinyl chloride is within the range of 2.0 to 3.0 through a reaction zone at a temperature within the range of 300-370° C. in the presence of an oxychlorination catalyst deposited on a carrier having a surface area within the range of 10-200 m.$^2$/g. in a fluidized state.

2. The process as claimed in claim 1 in which the reaction temperature is within the range of 310° to 350° C.

3. The process as claimed in claim 1 in which the product of the oxychlorination reaction contains 15 to 80 molar percent of 1,1,2-trichloroethane, 1,1,2,2-tetrachloroethane and pentachloroethane.

4. The process as claimed in claim 1 in which the flow rate of ethylene and vinyl chloride mixture into the reaction zone is within the range of 0.5 to 20 moles per hour per liter of catalyst.

5. The process as claimed in claim 1 in which the flow rate of ethylene and vinyl chloride mixture into the reaction zone is within the range of 1 to 8 moles per hour per liter of catalyst.

6. The process as claimed in claim 1 in which HCl is present in the reaction mixture in the molar ratio of $HCl/(C_2H_4+C_2H_3Cl)$ within the range of 2.2 to 3.0.

7. The process as claimed in claim 1 in which the oxygen is present in the reaction mixture in the molar ratio of $O_2/(C_2H_4+C_2H_3Cl)$ within the range of 0.65 to 1.0.

8. The process as claimed in claim 1 in which the HCl and oxygen are present in the reaction mixture in the molar ratio of $HCl/O_2$ within the range of 2 to 3.3.

9. The process as claimed in claim 4 in which the materials are present in the reaction mixture in the molar ratio of $HCl/(C_2H_4+C_2H_3Cl)$ within the range of 2.0 to 3.0 and $O_2/(C_2H_4+C_2H_3Cl)$ within the range of 0.6 to 1.5.

10. The process as claimed in claim 4 in which the materials are present in the reaction mixture in the molar ratio of $HCl/(C_2H_4+C_2H_3Cl)$ within the range of 2.2 to 3.0 and $O_2/(C_2H_4+C_2H_3Cl)$ within the range of 0.65 to 1.0.

11. The process as claimed in claim 1 in which the catalyst comprises a catalytic agent deposited on a carrier of an attapulgite clay having an average specific surface area of 10 to 160 m.$^2$/g.

12. The process as claimed in claim 1 in which the catalytic material comprises a catalytic agent on a carrier in the form of silica and magnesia mixture having an average specific surface area within the range of 40–200 m.$^2$/g.

13. The process as claimed in claim 1 which includes the step of adding 1,2-dichloroethane in the feed in a molar ratio of up to 2 based on the ethylene and vinyl chloride mixture.

14. The process as claimed in claim 1 in which the reaction is carried out under a pressure of 1 to 10 absolute bars.

15. The process as claimed in claim 1 in which the reaction is carried out under a pressure of 4 to 9 absolute bars.

16. A process for oxychlorination of a mixture of ethylene and vinyl chloride to produce chlorinated derivatives of ethane in which at least 15 mole percent comprises 1,1,2 - trichloroethane, 1,1,2,2 - tetrachloroethane and pentachloroethane comprising the step of passing a gaseous feed mixture of HCl, an oxygen-containing gas and the mixture of ethylene and vinyl chloride containing 15 to 93 mole percent ethylene and 7 to 85 mole percent vinyl chlorine in which the ratio of oxygen to the ethylene and vinyl chloride is within the range of 0.6 to 1.5 and the ratio of HCl to ethylene and vinyl chloride is within the range of 2.0 to 3.0 through a reaction zone at a temperature within the range of 300–370° C. in the presence of an oxychlorination catalyst deposited on a carrier comprising a silica-based mixture comprising magnesia having a surface area within the range of 10–200 m.$^2$/g. in a fluidized state.

References Cited

UNITED STATES PATENTS

| | | | |
|---|---|---|---|
| 2,866,830 | 12/1958 | Dunn et al. | 260—659(OXY)X |
| 3,010,913 | 11/1961 | Price | 260—659(OXY)X |
| 3,420,901 | 1/1969 | Schulz | 260—659(OXY) |
| 3,427,359 | 2/1969 | Rectenwald et al. | 260—659(OXY) |
| 3,461,084 | 8/1969 | Li | 260—659(OXY)X |
| 3,468,968 | 9/1969 | Baker et al. | 260—659(OXY) |

FOREIGN PATENTS

| | | | |
|---|---|---|---|
| 451,379 | 5/1942 | Canada | 260—659(OXY) |
| 992,847 | 5/1965 | Great Britain | 260—659(OXY) |
| 1,417,810 | 10/1965 | France | 260—659(OXY) |

OTHER REFERENCES

Mantell, Adsorption, TP156, A35M3, 1951, C. 6.

BERNARD HELFIN, Primary Examiner

J. A. BOSKA, Assistant Examiner

U.S. Cl. X.R.

260—659A